Figure 1:
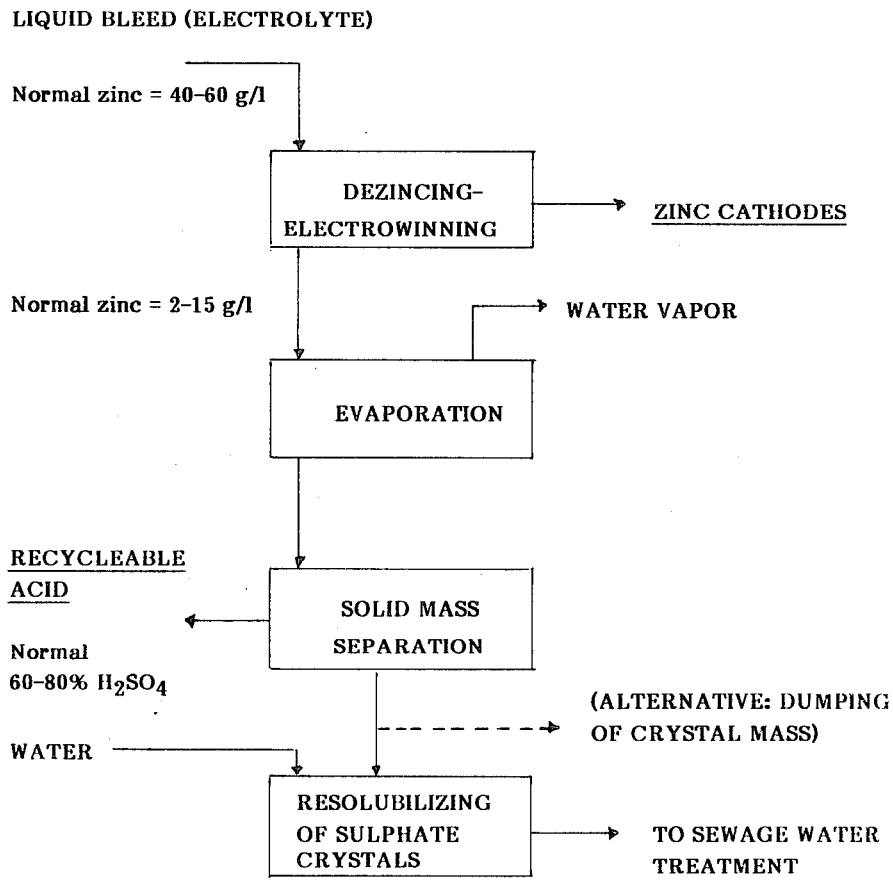

United States Patent [19]

Dyvik et al.

[11] Patent Number: 4,710,277

[45] Date of Patent: Dec. 1, 1987

[54] METHOD FOR MANUFACTURING ZINC HYDROMETALLURGICALLY

[75] Inventors: Fröystein Dyvik, Odda; Thomas K. Miöen, Stockholm, both of Sweden

[73] Assignee: Boliden Aktiebolag, Stockholm, Sweden

[21] Appl. No.: 937,074

[22] Filed: Dec. 2, 1986

[30] Foreign Application Priority Data

Dec. 20, 1985 [SE] Sweden ................................ 8506050

[51] Int. Cl.$^4$ .............................................. C25C 1/14
[52] U.S. Cl. .................................................... 204/119
[58] Field of Search ......................................... 204/119

[56] References Cited

U.S. PATENT DOCUMENTS

| | | | |
|---|---|---|---|
| 1,429,330 | 9/1922 | Ellsworth | 204/119 |
| 2,454,142 | 11/1948 | Ellsworth | 204/119 |
| 4,252,622 | 2/1981 | Freeman et al. | 204/119 |
| 4,290,866 | 9/1981 | Bolton et al. | 204/119 |

FOREIGN PATENT DOCUMENTS 0134644  3/1985  European Pat. Off. ............ 204/119

*Primary Examiner*—R. L. Andrews
*Attorney, Agent, or Firm*—Burns, Doane, Swecker & Mathis

[57] ABSTRACT

The present invention relates to a method for manufacturing zinc hydrometallurgically from zinc-containing starting materials. The method comprises one or more leaching stages, one or more solution purifying stages and one or more electrowinning stages for recovering metallic zinc from the leaching solution obtained. The method is operating with a closed solution circuit. A predetermined part volume of the solution obtained in the electrowinning stage or stages is withdrawn and concentrated by evaporation so as to precipitate any magnesium and manganese present in the part volume in the form of metal salt crystals. The precipitated crystal mass is separated from the residual liquid phase. The liquid phase in this manner purified with respect to magnesium and manganese can be recycled to the leaching process or utilized for some other purpose. When the process is carried out in a sulphate environment, the solution obtained in the electrowinning stage or stages is concentrated to a sulphuric acid concentration of at least 60% by weight.

The precipitated crystal mass, which has but a small volume, may be dumped to no disadvantage. In accordance with a preferred embodiment, the crystal mass is re-dissolved in a small quantity of water, thereby enabling practically all the zinc content to be recovered in metallic form, by electrowinning.

15 Claims, 2 Drawing Figures

METHOD FOR MANUFACTURING ZINC HYDROMETALLURGICALLY

The present invention relates to a method for manufacturing zinc hydrometallurgically from zinc-containing starting materials comprising one or more leaching stages, one or more solution purifying stages and one or more electrowinning stages for recovering zinc from the resultant leaching solution, and operating with a closed solution circuit.

As a fundamental step normally applied in zinc manufacturing processes utilizing hydrometallurgical methods, a zinc-containing starting material, which may be in the form of an oxide, a carbonate, a sulphate, a silicate, or a sulphide, is treated with an aqueous leaching solution in order to leach out/extract the zinc present in the material. As a result, the zinc is dissolved in an aqueous phase, together with a number of other elements present in the starting material. This aqueous phase is then purified of the contaminating elements, and the zinc present is finally recovered in metallic form from an aqueous electrolyte with the aid of an electrowinning process.

Although the aforedescribed process is carried out predominantly in a sulphate environment, the major part of the process can also be applied in other environments, for example, in a chloride or nitrate environment. The following discussions are made with reference to methods based on experiences obtained in sulphate environments, since these environments are totally dominating at present.

An electrowinning process which is carried out in a sulphate environment results in acid generation. Upon completion of a dezincing/elektrowinning process, this acid is passed back to a new leaching/extraction stage in which zinc is separated from a fresh batch of starting material. Consequently, in principle, the process operates with a closed solution circuit, which cyclically passes the stages extraction, purification, electrowinning and new extraction. In order for this process to provide satisfactory results, it must be possible to separate from the solution circuit all of those elements which have passed into solution together with the zinc present in the starting material. If this cannot be achieved at the same rate as that at which leaching is effected, the proportion of elements not removed from the system will accumulate in sequential circuits or cycles. This may cause the system to become unbalanced, and individual elements may become concentrated to such high levels as to impair or jeopardize the main process.

Present day technology within this field includes methods capable of creating a balance with regard to the large majority of those elements which are leached from the starting material together with zinc. The purifying processes normally applied are based on a spectrum of partially complex precipitation processes, in which the deleterious elements are precipitated from the solution and removed. Conventional zinc manufacturing technology is described in a large number of publications and will not therefore be described here. There are also a large number of elements which cannot be removed to a satisfactory extent by means of the known purifying methods. This is due to the fact that these elements fail to form not-readily dissolved compounds to a sufficient degree within those process conditions that are applicable to zinc hydrometallurgy.

Magnesium and manganese are of particular significance in this connection. The accumulation of magnesium is a classic problem and important within the field of zinc metallurgy. Magnesium present in the starting material normally dissolves very readily during the zinc extraction processes. No practicable technology is known for precipitating or separating magnesium from zinc in aqueous solutions. The magnesium therefore becomes concentrated to elevated—and ultimately critical—levels during the extraction process. The only way to avoid further accumulation in the extraction circuits is to remove magnesium-containing solution from the system in an amount which corresponds to the amount of magnesium entering the process at each moment in time (liquid bleed). Since the solution removed also normally contains significant quantities of zinc and/or acid, the process required to treat the solution is normally highly expensive and complicated. Many publications related to those problems associated with the accumulation of magnesium are to be found in the literature.

A publication by G. J. Krauss (Proc. conf. "Zinc-85" Tokyo Oct. 14–16/1985, p. 467–479) teaches that in some cases the magnesium content can also determine, in practice, the limits deciding what starting materials can be used for the manufacture of zinc. If the magnesium content of the starting material is too high, the value of the material will fall, due to the problems and costs involved in achieving a balance in the system with the aid of liquid-bleed treatment processes. In certain instances, the magnesium content of the starting material may be so high as to render the material useless for zinc manufacturing purposes, and therefore of no pecuniary value in this regard.

A publication by Siddle & Meisel (Proc. 105 AIME Meeting, Las Vegas 22–26/2 1976) describes alternative treatment processes for achieving a magnesium balance with the aid of liquid bleed processes.

It is further proposed in U.S. Pat. No. 1 429 330 (Ellsworth) to treat the acid leach solution with zinc metal to neutralize the solution and cementating a part of the copper content, if any. A strong base and preferably also an oxidant is then supplied to the solution to render to solution basic and iron-free, whereafter the solution is evaporated to precipitate the requisite amount of magnesium and/or manganese in the form of basic metal salts. However, considerably amounts of zinc is also inherently precipitated together with the impurities and thus a calcining stage is provided to separate zinc from magnesium.

It is evident from these publications that the costs entailed by the aforesaid processes are also very high, and that the processes can only be applied under special conditions.

It is implicit from the description given in these publications that very large quantities of contaminated gypsum waste is unavoidably formed when applying the method most commonly used to solve the aforesaid problem, i.e. precipitation/neutralization with lime as a neutralizing agent.

Thus, a simple estimate shows that an absolute daily minimum of basic material, corresponding to a net amount of about 17 t $Ca(OH)_2$ must be used in order to neutralise/precipitate a daily process volume of 100 $m^3$ zinc sulphate solution of typical composition (150 g/l Zn), therewith resulting in a daily quantity of about 40 t gypsum precipitate ($CaSO_4.2H_2O$).

When dumped, this amount of gypsum will always be accompanied by a significant quantity of liquid, and the costs entailed by dumping the waste will be quite significant. The dumping of waste constitutes, at present, one of the most serious problems encountered within the field, and this problem becomes particularly serious when the waste comprises a highly voluminous sludge that contains heavy metals.

An alternative method for treating liquid bleed has been proposed in a publication by J. Zakrzewski et al (Proc. Extraction Metallurgy '85, Symposium IMM London Sep 9-12/85), in which neutralization is effected with a magnesium-oxide containing material, whereafter zinc and manganese are precipitated from the solution with ammonium bicarbonate. The resultant precipitate is separated for further processing, whereafter $MgSO_4.7H_2O$ is precipitated from the solution.

In order to apply this method it is necessary to have access to large quantities of inexpensive starting materials of specific quality, and then preferably starting materials which contain magnesium oxide. It is also recommendable that a market can be found for the large quantities of magnesium sulphate unavoidably produced when practising this method. These conditions can only be met on a very few number of occasions, and the process can not therefore be used as a general process.

The present invention provides a process which solves the problems associated with the accumulation of the aforesaid problematic elements in a manner which eliminates, or greatly reduces the scope of the aforesaid drawbacks.

The method according to the present invention is characterized by withdrawing a predetermined part volume of the solution obtained in said electrowinning stage or stages, concentrating said part volume so as to precipitate by evaporation any mangesium and manganese present in the part volume in the form of metal salt crystals, separating the precipitated crystal mass from the residual liquid phase, and optionally recycling the liquid phase purified in this manner with respect to magnesium and manganese to the leaching stage or utilizing said liquid phase for some other purpose, the part volume being determined so that accumulation of magnesium and manganese in the solution is avoided.

Thus, an essential feature of the present invention is that a part volume of solution outgoing from the electrowinning stages is withdrawn as a bleed from the main process, whereafter the bleed is evaporated to separate Mg, Mn and also any remaining Zn from the residual liquid phase, i.e. the acid present in the bleed. The magnitude of the part volume is determined by the metal balance of the main process so that the content of Mg and/or Mn in the closed solution circuit is at least essentially constant so that no accumulation of these elements occurs in the circuit solution. Thus, the part volume withdrawn is mainly dependent on the evaporation efficiency and the supplied amount of the actual impurities to the process.

Thus, the main principles of the process according to the invention are based on a combination of a series of process stages described in more detail hereinafter with reference to FIGS. 1 and 2 of the accompanying drawing, these figures being block schematics which illustrate two embodiments of the invention.

Subsequent to electrowinning zinc in a conventional manner, the predetermined, requisite volume of electrolyte partially freed of zinc (=return acid) is tapped-off continuously or discontinuously for further processing.

A normal zinc content and acid content of this return acid is as follows:
40–60 g/l $Zn^{2+}$, 150–180 g/l $H_2SO_4$, 8–15 g/l $Mg^{2+}$ and 1–3 g/l $Mn^{2+}$.

As will be seen from FIG. 1, this solution is subjected to a further electrowinning process, so as to chemically reduce the zinc content of the solution to metallic form on aluminium cathodes, whereafter the metal can be recovered in product form, using conventional technology.

The thus dezinced solution is concentrated by evaporation until the acid strength reaches a concentration of about 60–80% $H_2SO_4$. It has been found when practising the method according to the invention that the solubility of zinc and magnesium decreases radically at acid strengths of this magnitude. Consequently, there is precipitated a crystal mass which comprises mainly zinc sulphate, magnesium sulphate and manganese sulphate. Consequently, when the liquid phase (the sulphuric acid) is subsequently separated from the crystal mass, only a very small part of the aforesaid elements will accompany the acid phase. The acid phase can therefore be recycled to the cyclic process, for example to the leaching stage, without the problematic elements (Mg, Mn) accompanying the acid and disturbing the process through undesirable recycling. The method thus separates successfully the acid from the zinc, magnesium and manganese present. Simultaneously, an essential elimination also of other deleterious elements present in the solution is obtained, for example of Cl and F.

Although the crystal mass separated out can, in itself, be dumped safely, since it has but a small volume in this connection, as indicated in FIG. 1, it is preferred to dissolve the mass in a small quantity of water. In this way, there is produced a weakly acid aqueous solution of $MgSO_4$, $ZnSO_4$, $MnSO_4$, together with a small amount of the original acid content.

This aqueous solution can thereafter be subjected to a further treatment process in accordance with one of a number of methods. Since only a very small quantity of acid accompanies the aqueous solution of said elements, zinc can be precipitated by neutralizing the solution at a high pH, with the aid of a minor quantity of neutralizing agent. This represents considerable savings in the consumption of neutralizing agent, while only a small quantity of gypsum is formed, thereby alleviating the aforesaid dumping problem.

Figure 2:
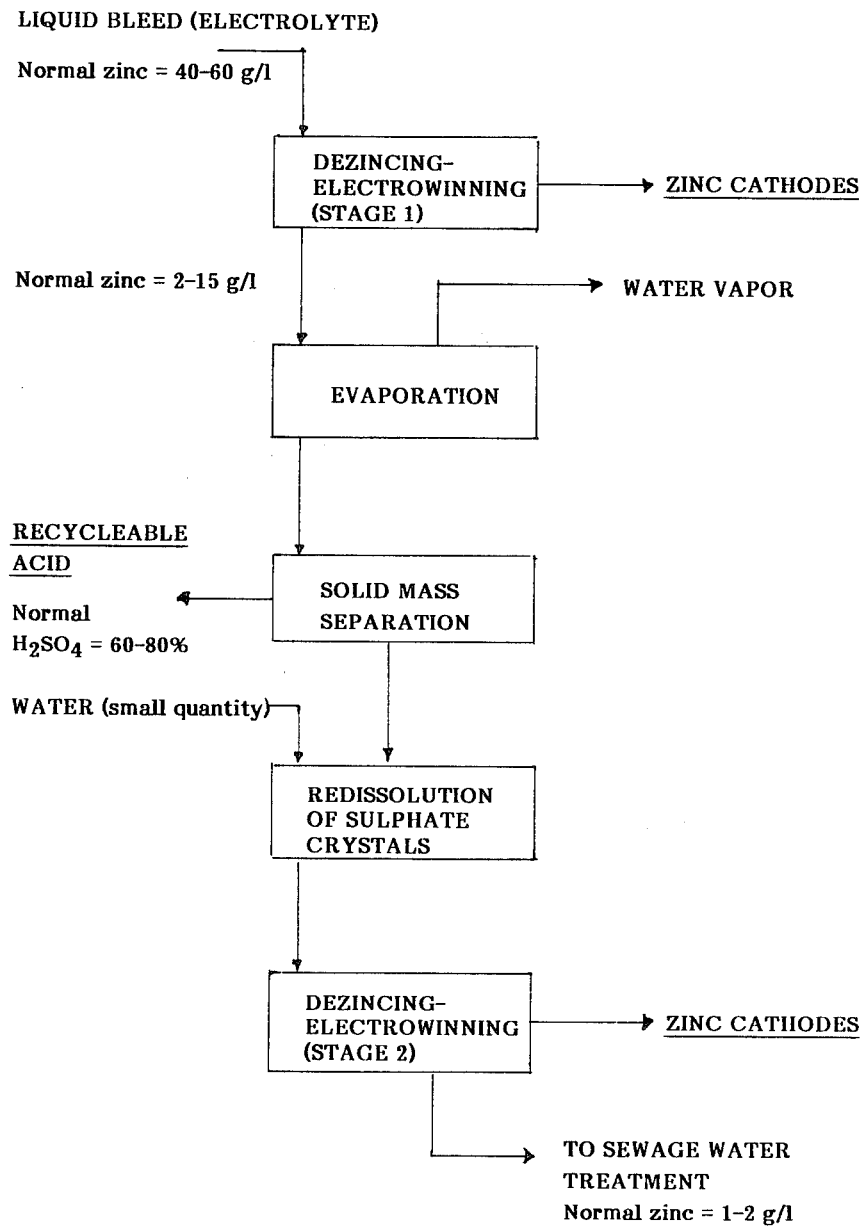

In accordance with a preferred embodiment of the invention illustrated in FIG. 2, however, the aqueous solution obtained when re-dissolving the crystal mass is transferred to a further electrowinning stage.

Since the acid present in the electrolyte used in the described separation method has previously been reduced to a low level, it has been surprisingly found that practically all the zinc present in the solution can be recovered with the aid of an electrowinning process using conventional process equipment. Thus, this means that practically all the zinc extracted in the solution can be recovered in metallic form, which has hitherto been impossible with the aid of known technology.

It will be obvious to all those skilled in this art that the method described above affords many important advantages over the previously known methods. The following can be mentioned in this regard:
(A) The zinc content is recovered from the extracted liquid volume, by electrowinning, using the same type of process equipment as that used to carry out the main process of zinc manufacture.

For the purpose of carrying out the process technically, it is advantageous to work with standard process units and equipment in zinc extraction.

(B) The metal is recovered directly in a refined, metallic form as cathodes, and thus has a total product value. When applying known methods, zinc is recovered/purified by precipitating out chemical compounds. This requires the use of a complicated and detailed process for recovering and refining the compounds to metal form.

(C) Normally, large quantities of sulphuric acid are recovered, which can be used directly by recycling the acid to the extraction process, and which thus has a significant pecuniary value. For example, By evaporating 100 $m^3$ of "return electrolyte" each day, there is normally produced and recovered 19–20 tons/day $H_2SO_4$, calculated as a 100% acid. Since the acid has a form and concentration which is highly favourable to the main zinc-extraction process, the acid has a full market value, since it replaces the use of a purchased corresponding quantity of acid. The acid recovered and purified when practising the process according to the invention can also be used for other purposes, for example in the manufacture of fertilizers.

(D) Mention has already been made of the large quantities of neutralizing agent required and the large quantities of gypsum produced when neutralizing/purifying with an untreated electrolyte, as opposed to when proceeding in accordance with the invention.

Thus, when practising the method according to the invention, the alkali requirement and the amount of gypsum produced are reduced to a fraction of the aforementioned when the solution is to be finally purified prior to being released to a recipient.

The method according to the present invention can be used in all hydrometallurgical zinc recovery processes which include leaching and electrowinning processes, and in which the zinc ion is coupled to an anion which enables a crystal mass to be formed from the metals present.

The invention is described below with reference to a number of working examples.

EXAMPLE 1

An electrolyte containing zinc sulphate and obtained from a conventional zinc manufacturing plant and having the composition set forth in Table 1-1 was subjected to a dezincing-electrowinning process in conventional zinc electrolysis cells. Cathode plates of rolled aluminium and anodes of lead, alloyed with 0.7% Ag, were used.

The electrowinning process resulted in a reduction in the zinc content of the solution to 10.7 g/l. The content of $Mg^{2+}$, $Mn^{2+}$ and $H_2SO_4$ was respectively 8 g/l, 1.4 g/l and 210 g/l.

11 liters of the solution were evaporated to a final volume of about 1 l. This evaporation process resulted in the precipitation of a crystal mass, which was separated from the concentrated acid phase by centrifugation. The crystal mass was then re-dissolved in a minor quantity of water.

Analyses and quantitative values are set forth in Table 1-1 and the balances are given in Table 1-2.

TABLE 1-1

| | ANALYSES | | | | |
|---|---|---|---|---|---|
| | Volume l | Zinc g/l | $H_2SO_4$ g/l | Mg g/l | Mn g/l |
| Return acid to dezincing electrolysis | 11 | 50.0 | 150 | 8.0 | 2.0 |
| Dezinced electrolyte | 11 | 10.7 | 210 | 8.0 | 1.4 |
| Separated acid phase | 1.81 | 0.4 | 1210 | 3.0 | 0.9 |
| Water-dissolved crystals | 2.2 | 53.1 | 54 | 35.7 | 6.3 |

TABLE 1-2

| | BALANCES | | | | | | | |
|---|---|---|---|---|---|---|---|---|
| | Zn | | $H_2SO_4$ | | Mg | | Mn | |
| | g | % | g | % | g | % | g | % |
| Amount present in dezinced electrolyte | 117.7 | 100 | 2310 | 100 | 88 | 100 | 15.4 | 100 |
| Amount present in recovered/recycled acid | 0.72 | 0.7 | 2190 | 94.8 | 5.43 | 6.1 | 1.6 | 10.4 |
| Amount dissolved in aqueous phase from crystals | 117.0 | 99.4 | 119 | 5.2 | 83 | 94 | 13.8 | 90 |

It will be seen from the above that 94.8% of the sulphuric acid was recovered and recycled, although only 6.1% of the magnesium content of the acid was recycled. The acid content of the aqueous phase was reduced from 2310 g to 119 g. Thus, when the aqueous phase is to be purified by neutralizing processes, the amount of alkali required to neutralise the free acid is reduced by about 95%.

EXAMPLE 2

The aqueous phase from Example 1 was subjected to an electrowinning process in an electrolysis cell incorporating aluminium cathodes and lead anodes alloyed with 0.7% silver.

During the electrowinning process the zinc content of the electroyte was reduced to a residual level of 1.4 g/l. The zinc was precipitated cathodically to form a coating of an appearance normal for cathodic zinc metal.

Analyses and balances are set forth in Tables 2-1 and 2-2.

TABLE 2-1

| | ANALYSES | | | | |
|---|---|---|---|---|---|
| | Volume l | Zn g/l | $H_2SO_4$ g/l | Mg g/l | Mn g/l |
| Quantity of electrolyte used | 2.0 | 53.1 | 54 | 37.7 | 6.3 |
| Final electrolyte | 2.0 | 1.4 | 134 | 37.7 | 3.0 |

TABLE 2-2

| | BALANCES | | | | | |
|---|---|---|---|---|---|---|
| | Zn | | Mg | | Mn | |
| | weight (g) | % | weight (g) | % | weight (g) | % |
| Quantity of | 106.2 | 100 | 75.4 | 100 | 12.8 | 100 |

TABLE 2-2-continued

| | BALANCES | | | | | |
|---|---|---|---|---|---|---|
| | Zn | | Mg | | Mn | |
| | weight (g) | % | weight (g) | % | weight (g) | % |
| electrolyte used | | | | | | |
| Final electroyte | 2.8 | 2.7 | 75.4 | 100 | 6.0 | 46.9 |
| Amount of cathodic zinc metal produced | 103.4 | 97.4 | | | | |

As will be seen from Table 2-2, 97.4% of the zinc content was recovered in metallic form from the original starting solution (dezinced electrolyte).

In relation to the zinc content of the return acid recycled to the dezincing electrolysis process, 99.5% of the zinc and 94.8% of the sulphuric acid were recovered in a manner such that solely 6.1% of the magnesium content was recycled.

We claim:

1. A method for manufacturing zinc hydrometallurgically from a zinc-containing starting material that has been treated with at least one leaching stage to form a solution, at least one solution purifying stage and at least one electrowinning stage from which recovered liquid is recycled to at least one of said leaching stages, said method comprising:
   (a) withdrawing a predetermined portion of the solution from after at least one of said electrowinning stages, said portion containing dissolved zinc, magnesium and manganese;
   (b) concentrating the portion by evaporation to precipitate magnesium and manganese in the form of metal salt crystals; and
   (c) separating the metal salt crystals from the portion so as to form a residual liquid phase, said predetermined portion being selected so that accumulation of magnesium and manganese in the solution is avoided.

2. The method of claim 1 wherein the solution contains sulphuric acid and the portion is concentrated by evaporating to a sulphuric acid concentration of at least 60% by weight.

3. The method of claim 1 wherein the portion is subjected to electrowinning to reduce the level of zinc to between 2 and 15 g/l prior to concentrating the solution.

4. The method of claim 1 wherein the precipitated metal salt crystals are redissolved to form an aqueous phase which is then subjected to water purification.

5. The method of claim 4 wherein the water purification includes selective precipitation and recovery of zinc.

6. The method of claim 5 wherein the selective precipitation is achieved by pH adjustment.

7. The method of claim 5 wherein the selective precipitation is achieved by addition of a carbonate compound.

8. The method of claim 5 wherein the selective precipitation is achieved by addition of a phosphate compound.

9. The method of claim 5 wherein the selective precipitation is achieved by addition of a fluoride compound.

10. The method of claim 5 wherein the selective precipitation is achieved by precipitation of basic sulphate.

11. The method of claim 5 wherein the water purification includes liquid/liquid extraction to recover zinc.

12. The method of claim 1 wherein the metal salt crystals are redissolved in water and the resulting zinc, magnesium and manganese-containing solution is subjected to electrowinning for selectively recovering zinc as a metallic cathodic deposition.

13. The method of claim 12 wherein the electrowinning of the redissolved metal salt crystals is conducted to reduce the zinc content of the solution to about 1 to 5 g/l.

14. The method of claim 1 wherein the withdrawn portion is composed of 40–60 g/l dissolved zinc, 150–180 g/l sulphuric acid, 8–15 g/l dissolved magnesium and 1–3 g/l dissolved manganese.

15. The method of claim 1 wherein at least a portion of the liquid phase from step (c) is recycled to at least one of said leaching stages.

* * * * *

UNITED STATES PATENT AND TRADEMARK OFFICE
CERTIFICATE OF CORRECTION

PATENT NO. : 4,710,277
DATED : December 1, 1987
INVENTOR(S) : Froystein Dyvik et al It is certified that error appears in the above-identified patent and that said Letters Patent is hereby corrected as shown below:

On the title page assignee should read

--(73) Assignee: Norzink A/S --.

Signed and Sealed this

Thirteenth Day of September, 1988

Attest:

DONALD J. QUIGG

*Attesting Officer*  *Commissioner of Patents and Trademarks*